US008238921B2

(12) United States Patent
Chang et al.

(10) Patent No.: US 8,238,921 B2
(45) Date of Patent: Aug. 7, 2012

(54) USER ZONE INFORMATION TRANSMISSION MANAGEMENT

(75) Inventors: Henry Chang, San Diego, CA (US); Doug Dunn, Chula Vista, CA (US)

(73) Assignee: KYOCERA Corporation, Kyoto (JP)

( * ) Notice: Subject to any disclaimer, the term of this patent is extended or adjusted under 35 U.S.C. 154(b) by 648 days.

(21) Appl. No.: 12/267,413

(22) Filed: Nov. 7, 2008

(65) Prior Publication Data

US 2010/0120398 A1    May 13, 2010

(51) Int. Cl.
*H04W 36/00* (2009.01)
(52) U.S. Cl. ........ 455/444; 370/331; 370/332; 455/41.2
(58) Field of Classification Search .............. 455/444
See application file for complete search history.

(56) References Cited

U.S. PATENT DOCUMENTS

| 5,574,971 | A  | * | 11/1996 | Aihara ........................... 455/441 |
| 6,529,491 | B1 | * | 3/2003  | Chang et al. .................. 370/335 |
| 6,729,929 | B1 | * | 5/2004  | Sayers et al. .................. 455/446 |
| 6,980,820 | B2 | * | 12/2005 | Sinnarajah et al. ........... 455/515 |
| 7,502,622 | B1 | * | 3/2009  | Lekutai ......................... 455/466 |
| 7,929,970 | B1 | * | 4/2011  | Gunasekara et al. ......... 455/444 |
| 2002/0034947 | A1 | * | 3/2002  | Soliman ........................ 455/436 |
| 2008/0287130 | A1 | * | 11/2008 | Laroia et al. .................. 455/436 |
| 2010/0130212 | A1 | * | 5/2010  | So et al. ........................ 455/444 |

FOREIGN PATENT DOCUMENTS

| EP | 0 504 122 A2 | 9/1992 |
| WO | WO 2009/108709 | 9/2003 |
| WO | WO 2004/054153 A2 | 6/2004 |
| WO | WO 2009/108718 A1 | 9/2009 |

OTHER PUBLICATIONS

Vodafone Group et al, "Merged Text Proposals for TR 25.9 xx—Home NodeB RF" 3GPP Draft; R4-082623. 3rd Generation Partnership Project, Oct. 3, 2008 XP050325856.
International Search Report(ISR): PCT/ISA/210 for International Application No. PCT/US2009/063048, ISR dated Mar. 11, 2010.

* cited by examiner

*Primary Examiner* — Kamran Afshar
*Assistant Examiner* — Joseph Dean, Jr.

(57) ABSTRACT

A detecting base station transmits user zone information to wireless communication device when the presence of a wireless communication device is detected. A detecting base station receives a detection signal, such as an uplink signal, transmitted from the wireless communication device to determine the presence of the wireless communication device. The detecting base station notifies the core network the detection by transmitting a device proximity message and, after receiving authorization from the network, transmits the user zone information within the broadcast channel used by the originating base station communicating to the wireless communication device.

18 Claims, 8 Drawing Sheets

USER ZONE INFORMATION TRANSMISSION MANAGEMENT

BACKGROUND

The invention relates in general to wireless communication systems and more specifically to managing transmission of user zone information in a wireless communication system.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, improved coverage, higher user capacity for the area, additional service features, and/or improved quality of service. Femtocell base stations provide communications services to relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. Accordingly, the user device (wireless communication device), such as a handset, wireless personal digital assistant (PDA) or other such portable device, must acquire the pilot signal from the femtocell to acquire service. Conventional designs are limited in that they typically require the user device to periodically determine its location and compare its location to stored locations of femtocells resulting in extensive power consumption. Further, accuracy of the stored locations and determined device locations as well the relationship between the stored locations and the coverage area of a femtocell base station result in unsuccessful attempts by the user device to acquire service and dropped calls.

SUMMARY

User zone information is transmitted to a wireless communication device in response to detecting, at a detecting base station, a signal transmitted by the wireless communication device. In one example, the wireless communication device is communicating with an originating base station and the user zone information is transmitted by the detecting base station within a broadcast channel used by an originating base station.

DETAILED DESCRIPTION

Figure 1:
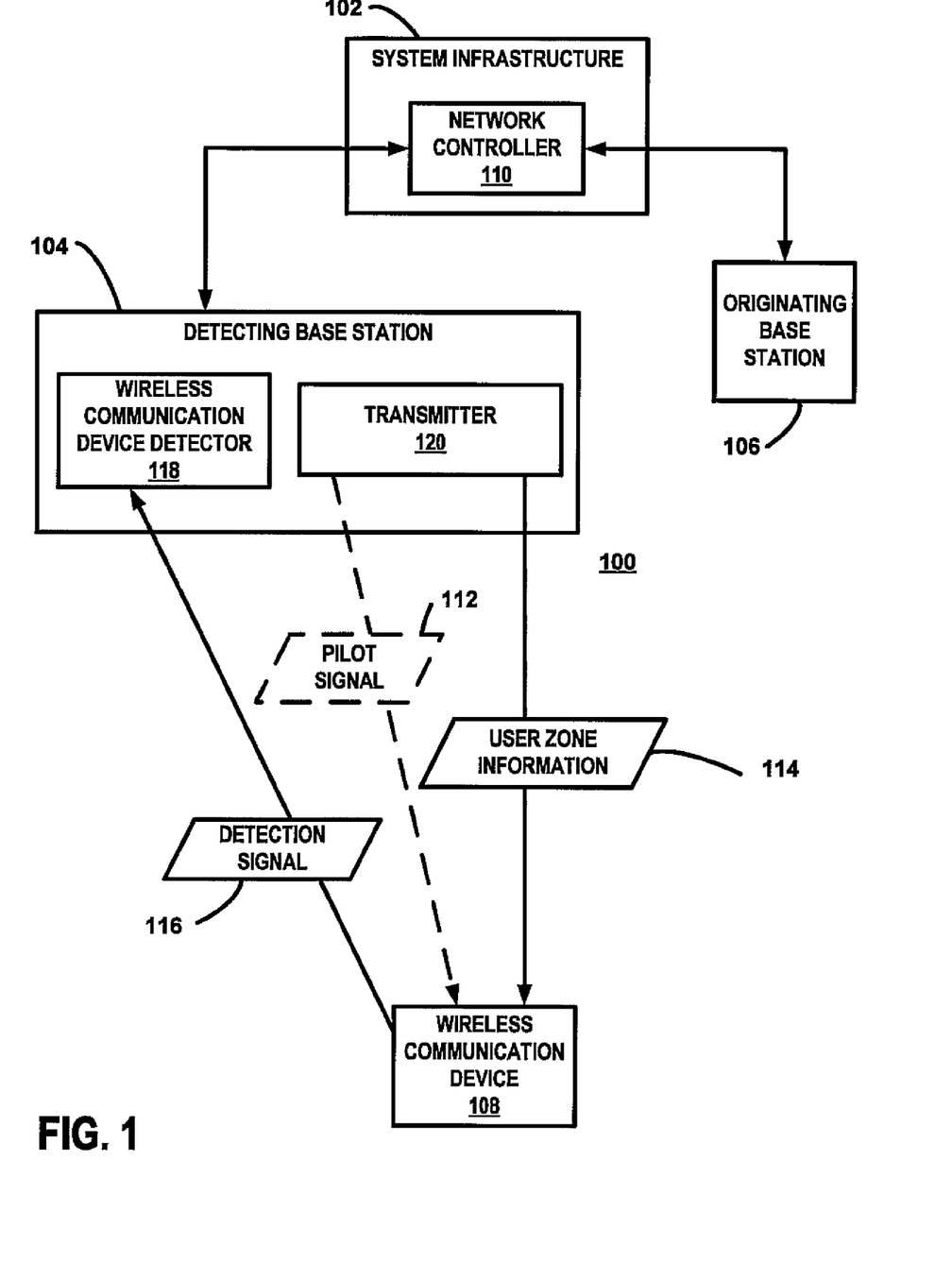
FIG. 1 is a block diagram of a communication system in accordance with the exemplary embodiment of the invention.

FIG. 1 is a block diagram of a communication system 100 in accordance with an exemplary embodiment of the invention. The communication system 100 may be implemented in accordance with any of numerous technologies and communication standards. In the exemplary embodiment, the system operates in accordance with a Code Division Multiple Access (CDMA) standard such as cdma2000 1X. Examples of other suitable communication standards include other CDMA standards such as 1xEV-DO and W-CDMA, OFDM based standards, GSM standards, UMTS standards, and WiMAX standards. The various functions and operations of the blocks described with reference to the communication system 100 may be implemented in any number of devices, circuits, and/or elements as well as with various forms of executable code such as software and firmware. Two or more of the functional blocks of FIG. 1 may be integrated in a single device and the functions described as performed in any single device may be implemented over several devices. For example, at least portions of the functions of the system infrastructure 102 and network controller 110 may be performed by the detecting base station 104, the originating base station 106, a base station controller, or a Mobile Switching Center (MSC) in some circumstances.

The communication system 100 includes system infrastructure 102 that is connected to one or more base stations 104, 106. Communications between the base stations 104, 106 and wireless communication devices 108 are at least partially managed by a network controller 110 with the system infrastructure 102.

In order for a wireless communication device 108 to communicate with a particular base station, the wireless communication device 108 must adequately receive a communication pilot signal transmitted from the particular base station. Communication pilot signals are used for communication between the wireless communication devices and base stations and provide information to the wireless communication devices facilitating control and synchronization as well as other communication functions. A communication pilot signal, for example, may provide a timing reference and channel information.

For the exemplary situation illustrated in FIG. 1, the wireless communication device 108 is communicating with an originating base station 106 and has not yet detected a pilot signal 112 transmitted by the detecting base station 104. In response to the detection of the wireless communication device 108 by the detecting base station 104, user zone information 114 is transmitted to the wireless communication device 108. For the examples discussed herein, the user zone information 114 is transmitted by the detecting base station 104 within a broadcast channel used by the originating base station 106. In some situations, the user zone information 114 of the detecting base station 104 may be transmitted by another device, such as the originating base station, for example. The broadcast channel is a logical broadcast channel that may be mapped to any of the common physical channels that can be received by multiple wireless communication devices. For the example, the common physical channels may be a physical Broadcast Channel or a Paging Channel as defined by a CDMA, UMTS, GSM, or other standard or protocol. For example, in the CDMA2000 1xRTT standard the broadcast channel is a logical channel is mapped to the Paging channel.

User zone information 114 describes operational parameters of the associated base station, cell, or service region that may be provisioned in wireless communication devices or sent by the base station, for example, using a broadcast message. In general, user zone information provisioned in the wireless communication device may contain a set of parameters that differ from the set of parameters used for broadcast messages. For provisioning, the downloaded parameters may be used to assist the wireless communication device in selecting an authorized base station. These parameters may include the access point ID, access point name, user zone ID, user zone SID, user zone name, bandclass, frequency channels, PN offset, user zone type. For the broadcast message, the set of parameters are primarily determined by a set of base station identifier such as access point ID, access point name, SID and NID. Since there may be multiple base stations in a user zone, the broadcast message may not need to include some of the user zone information such as the user zone ID or user zone type. Examples of defined user zone information parameters appears in "Over-the-air Service Provisioning of Mobile stations in Spread Spectrum Standards, Release C, Version published by the $3^{rd}$ Generation Partnership Project 2 ("3GPP2"), dated Oct. 22, 2004. The user zone information for provisioning may also be found in a 3GPP2 standard contribution C14-20080114-010. The user zone information for broadcasting may be found in the 3GPP2 standard contribution C22-20080825-016. As used herein, the term "user zone information" includes current descriptions found in standard contributions and other documents as well as future revisions. For the examples discussed, the user zone information allows the wireless communication device to identify one or more of a pseudorandom noise (PN) code offset of the detecting base station, a frequency band of the detecting base station, a channel of the detecting base station, and an identifier of the detecting base station. In some situations, the identification of a particular parameter is retrieving stored data correlating to received user zone information. For example, a base station identifier (AP_ID) provided in received user zone information can be correlated to a stored frequency and PN offset associated with the base station identified by the received identifier.

Based on a detection signal 116 transmitted by the wireless communication device 108, a wireless communication device detector 118 within the base station 104 detects the presence of a wireless communication device 108 that is authorized to access the base station 104. Although in some circumstances the detecting base station 104 may be able to autonomously transmit the user zone information 114, the detecting base station 104 informs the network controller 110 of the detection of the wireless communication device and transmits the user zone information only after receiving authorization from the network controller 110 for the examples discussed. The user zone information 114 includes data that allows the wireless communication device 108 to configure a receiver to receive the pilot signal 112 transmitted from the detecting base station 104. The user zone information 114 at least includes a base station identifier identifying the detecting base station 104 such as an AP_ID, for example. The wireless communication device 108 evaluates the user zone information 114 and, if the information matches stored user zone information 114 within the wireless communication device 108, tunes the receiver to the appropriate frequency and pseudorandom number (PN) offset and attempts to acquire the pilot signal 112 transmitted from the detecting base station 104. The frequency of the pilot signal 112 may be the same or different from the pilot signal of the originating base station. If the pilot signal 112 is acquired, the wireless communication device 108 may proceed with a handoff procedure evaluation and/or a handoff procedure in accordance with known techniques.

The received user zone information may be a collection of the same parameters that are stored as user zone information within the wireless communication device. In some circumstances, however, the stored user zone information will be a subset or a superset of the transmitted user zone information. If the stored information is a subset of the received user zone information, the received user zone information is determined to match the stored user zone information where the stored information is the same as the corresponding subset of the received information. If the received information is a subset of the stored user zone information, the received user zone information is determined to match the stored user zone information where the received information is the same as the corresponding subset of the stored information. If the set of parameters that are transmitted are the same as the parameters that are stored, the values of each parameter are compared to determine if the received user zone information matches the stored user information. A match is identified if all of the transmitted parameters match the stored parameters for the examples described. In some circumstances, however, a match may be identified where only selected parameters match.

In some situations, the transmitter 120 in the base station 102 may not transmit the pilot signal 112 until the wireless communication device 108 is determined to be sufficiently close to the base station 104 for communication. Accordingly, the arrow and block representing the transmission of the pilot signal 112 are illustrated with dashed lines in FIG. 1 to indicate that the pilot signal 112 is not continuously transmitted and/or is not continuously received by the wireless communication device. A description of a suitable apparatus and method for transmitting the pilot signal 112 based on the detection of the wireless communication device is provided in U.S. patent application Ser. No. 12/037,768, entitled "PILOT SIGNAL TRANSMISSION", filed on Feb. 26, 2008 and incorporated by reference in its entirety herein.

For the example, the detection of the detection signal 116 by the wireless communication device detector 118 is sufficient to determine that the wireless communication device 108 is present. The characteristic of the detection signal 116, however, may be any of numerous parameters with any of numerous thresholds depending on the particular implementation and the characteristic may be whether the detection signal 116 is detectable by the base station receiver. Examples of other characteristics include a signal to noise ratio (SNR), bit error rate (BER), power level, signal propagation time, and presence of particular data. For the example, the characteristic of the signal is the ability of the base station to demodulate and decode the detection signal 116 using a long code mask corresponding to authorized users of the detecting base station 104.

When the detecting base station 104 detects the presence of the wireless communication device 108, the detecting base station 104 transmits a device proximity message to the network controller 110 in the system infrastructure 102 at least indicating that the presence of the wireless communication device has been detected. In some situations, the device proximity message may also include distance information and other information useful to the network controller 110 in determining whether the detecting base station 104 should transmit the user zone information 114. The network controller 110 determines whether the wireless communication device 108 should attempt to acquire the detecting base station 104 to receive wireless services from the base station 104 (e.g. whether a handoff should be performed). The determination may be based on any number of factors which may include, for example, the available capacity on the originating base station 106, the capacity of the detecting base station 104, the bandwidth requirements of the wireless communication device 108, and quality of service (QoS) requirements. The network controller 110 sends an authorization message to the detecting base station authorizing the detecting base station to transmit the user zone information. In some situations, the network controller 110 may specify the timing of the transmission of the user zone information 114 or may delay authorization to send the user zone information. In response to receiving the authorization message, the detecting base station 104 transmits the user zone information 114. In some situations the transmission of the pilot signal 112 may dependent on the authorization message. For example, if the detecting base station 104 is not providing wireless service to any devices, the detecting base station 104 may refrain from transmitting the pilot signal 112 until authorization is received to transmit the user zone information 114. In some cases, the network controller 110 may decide that the wireless communication device should always attempt to acquire the detecting base station 104 if the detecting base station 104 detects the presence of the wireless communication device. Also, is some circumstances, the wireless communication device 108 determines whether acquisition of the detecting base station should be attempted. In some situations, therefore it may be desirable to let the wireless communication device decide whether it should stay with the originating base station 106 or attempt to acquire the detecting base station 104. The determination of when to allow the wireless communication device 108 whether to switch base station may be based on any of several factors where some factors include the state of the wireless communication device. For example, it may be preferred to allow the wireless communication device which base station to acquire or maintain while in the idle state. Allowing the network controller 110 to make the determination when to acquire another base station may be more crucial during active or connected state operations.

The base stations 104, 106 provide wireless services within geographical services areas sometimes referred to as cells. As discussed below with reference to FIG. 2A, FIG. 2B, and FIG. 2C, the originating base station 106 provides wireless service within a geographical service area that may overlap, completely surround, or be separate from the geographical service area of the base station 104. A suitable implementation of the detecting base station 104 with a device detector 118 is within a cellular communication system where the base station 104 is a femtocell base station that provides wireless communication services within a relatively small region to authorized users. The detecting base station 104, however, may be any base station within a communication system providing wireless service within a geographical service area that is smaller than an originating base station 106 geographical service area.

The detection signal 116 may be any wireless signal suitable to indicate to the wireless communication device detector 118 at least the presence of the wireless communication device 108. Examples of detection signals 116 include optical signals and radio frequency (RF) signals such as cellular, Bluetooth, Near-Field Communication and WiFi signals. In the exemplary embodiment, the detection signal is a reverse link (uplink) communication signal transmitted in accordance with wireless communications between the wireless communication device 108 and the originating base stations 106. In the exemplary implementation, the detection signal 116 provides information adequate for the wireless communication device detector 118 to determine that the wireless communication device 108 is an authorized user of the base station 104.

Figures 2A, 2B:
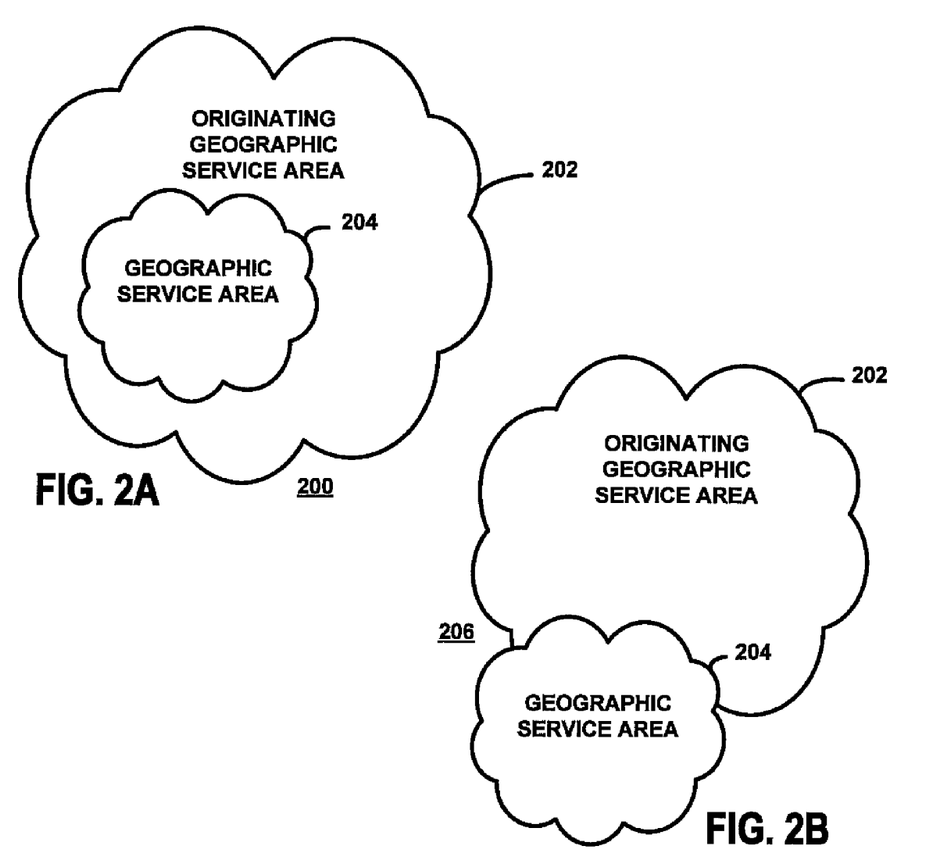
FIG. 2A is an illustration of an exemplary geographical service area relationship provided by an originating base station and detecting base station where the geographic service area of a detecting base station is within an originating geographic service area of the originating base station.
FIG. 2B is an illustration of an exemplary geographical service area relationship provided by the originating base station and the detecting base station where the geographic service area of a detecting base station overlaps with the originating geographic service area of the originating base station.
Figure 2C:
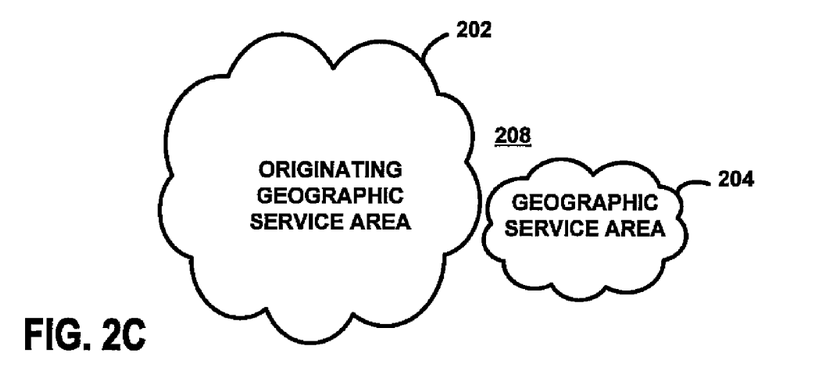
FIG. 2C is an illustration of an exemplary geographical service area relationship provided by the originating base station and the detecting base station where the geographic service area of a detecting base station does not overlap with the originating geographic service area of the originating base station.

FIG. 2A, FIG. 2B and FIG. 2C are depictions of exemplary geographical service area relationships 200, 206, 208 provided by the originating base station 106 and the detecting base station 104. An originating geographical service area 202 provided by the originating base station 106 and a geographic service area 204 provided by the detecting base station 104 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the detecting base station 104 is completely within the service area 202 provided by the originating base station 106. Such service area relationships 200 often occur where some base stations within the communication system provide smaller service regions such as provided by microcell, picocell, and femtocell base stations. For example, a femtocell base station located at a residence provides services for devices used by device users living at the residence. When the wireless communication devices are outside the service area 204, service is provided by larger macrocells. When the authorized wireless communication device is at the residence, however, service is provided by the base station presenting the smaller service area 204. Accordingly, in most situations, the service area 204 of the detecting base station 104 will be completely within the service area 202 of the originating base station 106. In some situations, however the service area 204 may be partially overlapping with the service area 202 as shown in FIG. 2B or may be non-overlapping but adjacent to the service area 202 as shown in FIG. 2C.

Figure 3:
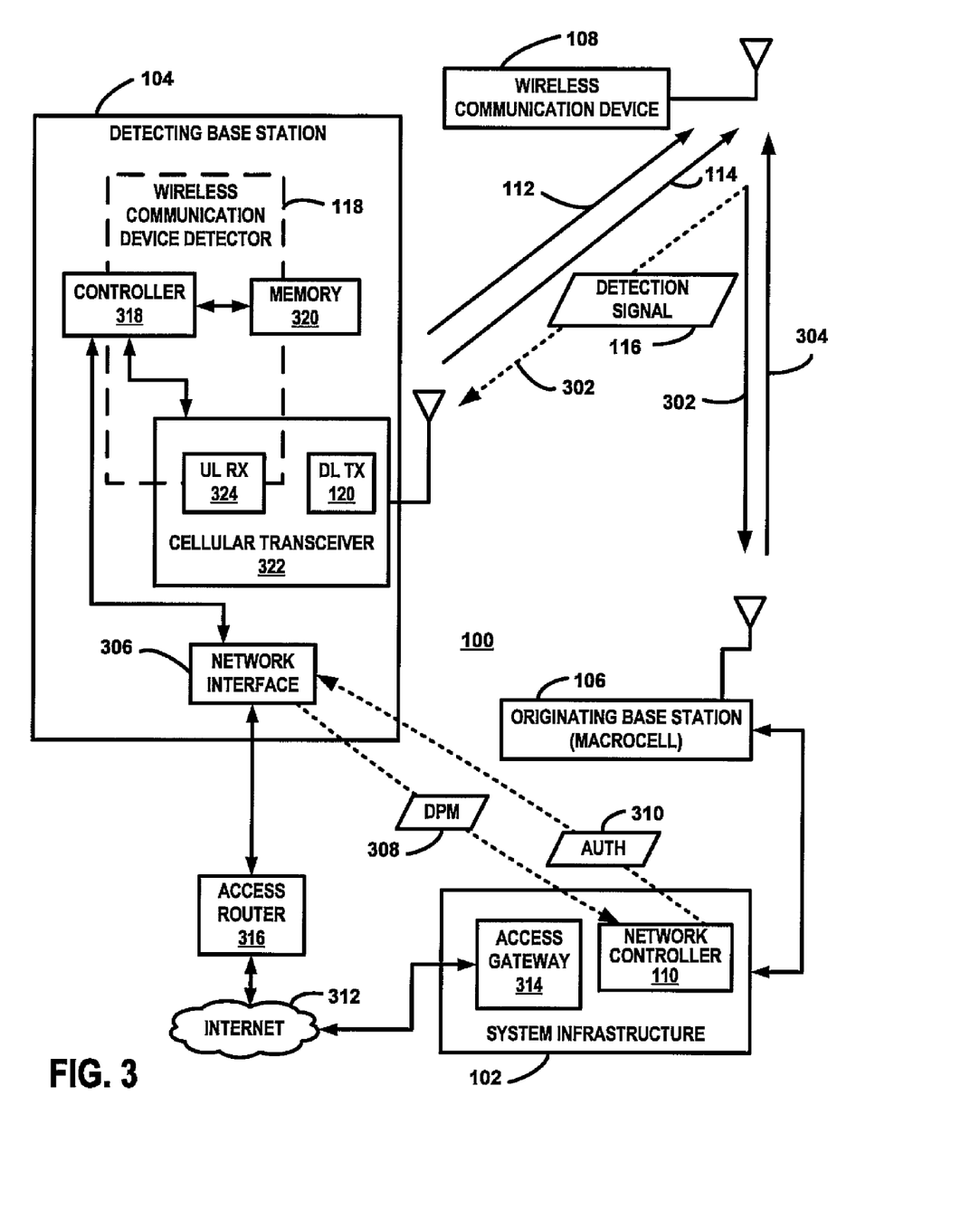
FIG. 3 is a block diagram of an exemplary communication system where the detection signal is an intercepted uplink (reverse link) cellular signal.

FIG. 3 is a block diagram of an exemplary communication system 100 where the detection signal 116 is an intercepted uplink (reverse link) cellular signal 302. The system 100 may be implemented using any variety of communication technologies and cell sizes. For the example discussed with reference to FIG. 3, the detecting base station 104 provides wireless service within a femtocell coverage area and the originating base station 106 provides service within a macrocell coverage area. The base stations 104, 106 operate in accordance with CDMA protocols and standards. The term macrocell is used primarily to distinguish this group of diverse technologies from picocells and femtocells that typically have smaller service areas on the order of 100 to 300 feet per base station. Accordingly, the originating base station 106 is any base station that provides wireless communication services within relatively large geographical areas as compared to the femtocell service area provided by the detecting base station in the example of FIG. 3. The functional blocks of FIG. 3 may be implemented using any combination of hardware, software and/or firmware. Two or more of the functional blocks may be integrated in a single device and the functions described as performed in any single device may be implemented over several devices. For example, at least portions of the functions of the system infrastructure 102 may be performed by the base station 106, a base station controller, or an MSC in some circumstances, as discussed above.

The originating base station 106 transmits downlink signals 304 to and receives uplink signals 302 from one or more wireless communication devices 108 to provide wireless communication service. As discussed herein, wireless communication services refer to any communications, control signaling, pilot signals or other communication that at least partially facilitates operation of the wireless communication device 108. Accordingly, wireless communication services may be provided to the wireless communication device when the device 108 is in non-traffic state such an idle state or an active state (traffic state).

The system infrastructure 102 includes the network controller 110 that may be implemented as a mobile switching center (MSC), a combination of an MSC and base station controllers (BSCs), or other similar communication controllers. The network controller 110 is connected to the base stations 104, 106 through the system infrastructure 102 and manages communications within the system 100. For the example, the detecting base station is connected to system infrastructure through the Internet. As described below in further detail, a network interface 306 within the detecting base station 104 sends device proximity messages 308 to and receives authorization messages 310 from the network controller through a backhaul. The network interface 306 facilitates communication with the Internet 312. The network interface 306 provides packet data communications and facilitates access to the Internet and to an access gateway 314 in the system infrastructure 102 through the access router 316. In some situations, the access router 316 may be implemented within the base station 104. In a typical arrangement, the detecting base station 104 is connected to the Internet through an Internet Service Provider (ISP) service provided by a digital subscriber line (DSL) or CATV connection. Accordingly, the access router 316 is a DSL modem or cable modem in the typical arrangement. In the examples discussed, therefore, the system infrastructure 102 comprises a packet switched core network that includes at least one access gateway 314. The access gateway 314 is a communication interface that allows the base station 104 to communicate with the system infrastructure 102 and controller 110.

The wireless communication device 108 is any type of communication device that is capable of communicating with the base stations 104, 106. The wireless communication device 106, sometimes referred to as an access terminal, may be a wireless modem, a personal digital assistant, cellular telephone, or other such device.

In addition to the functions and features discussed herein, the detecting base station 104 operates in accordance with the communication protocols of the communication system 100. The detecting base station 104 includes a controller 318, memory 320, cellular transceiver 322 and the network interface 306 in addition to other devices and software for performing the functions of the base station 104. The cellular transceiver 322 includes an uplink receiver 324 and the downlink transmitter 120. For the example in FIG. 6, the wireless communication device detector 118 is implemented by at least portion of the controller 318, memory 320, and uplink receiver 324. Accordingly, the wireless communication device detector 118 is illustrated with a dashed line box to indicate that the detector 118 may include some or all of the various functions and devices forming the cellular transceiver 322, memory 320 and/or controller 318.

In addition to other information, the memory 320 stores communication device identification values corresponding to each communication device 108 that is authorized to receive service from the base station 104. The communication device identification value may include an electronic serial number (ESN), Mobile station Equipment Identifier (MEID) or International Mobile Subscriber Identity (IMSI) or other unique data identifying the wireless communication device 108. An example of a group of identification values stored in memory 320 includes a collection of ESNs corresponding to the communication devices of the family members of a household where the base station 104 provides service. The identification values may be stored at the base station 104 using any of numerous techniques. An example of a suitable method of storing the values includes storing the values during an initialization procedure performed when the base station 104 is installed. The identification values may be provided, at least partially, by the core network or originating base station 106. In some implementations, the identification values may be omitted or the base station 104 may allow communication devices that do not have corresponding identification values stored at the base station 104 to receive service from the base station 104. As discussed below, the ESNs are used to generate long code masks such as public long code masks (PLCMs) which allow the detecting base station 104 to receive signals from the wireless communication device 108 having the particular ESN. Other information may be received from the core network (system infrastructure 102) to generate the PLCMs in accordance with known techniques. In some situations, the system infrastructure 102 (core network), or base station may assign the PLCM to a particular wireless communication device 108. The assigned PLCM value is stored in the base station 104. Also, a private long code mask may be used instead of or in addition to the PLCM in some cases.

During operation, the detecting base station 104 at least periodically monitors a wireless channel that may include the detection signal 116. The detection signal 116 may be any signal transmitted by the communication device 108, including but not limited to, registration messages, acknowledgement messages, reverse traffic channel data packets and signaling messages. For the example of FIG. 3, the detection base station 104 monitors the reverse link cellular channel used for transmitting signals from wireless communication devices 108 to the originating base station (macrocell base station) 106. The cellular uplink receiver 324 is tuned to the appropriate channel or channels to detect the uplink signal 302 transmitted by the wireless communication device 108. In the exemplary embodiment, the uplink receiver 324 sufficiently demodulates and decodes uplink signals to identify the long code mask. The long code mask is typically a 42 bit binary number that is unique to the wireless communication device 108. For the example, received signals are compared to a list of long code masks to determine if the signal was transmitted by an authorized wireless communication device 108. As described above, the authorized wireless communication devices are identified by device identifiers stored in memory. The identifiers either directly, or indirectly, correspond to long code masks that facilitate reception of the signals transmitted by the authorized devices in the exemplary embodiment. Typically, the PLCM is derived from a permutation of the bits of the ESN. PLCM may also be based on the Mobile station Equipment Identifier (MEID) or the International Mobile Subscriber Identity (IMSI). The base station 104 evaluates one or more characteristics of the uplink signal to determine if the wireless communication device transmitting the signal is within the service area of the base station 104 or at least whether the device is possibly within the service area of the detecting base station 104. In the exemplary embodiment, the controller 318 determines if the uplink signal 302 can be successfully received. If the signal can be received, the controller 318 determines that the wireless communication device 108 is sufficiently close to receive service from the base station 104. In some cases, the uplink signal 302 may be detected and received even though the wireless communication device 108 is not within the service area of the base station 104. In these circumstances, the wireless communication device 108 may unsuccessfully attempt to acquire service from the base station 104 or may not be able to receive the user zone information 114.

For the example of FIG. 3, the detecting base station 104 reports the detection of the presence of the wireless communication device 108 to the core network by sending a device proximity message 308. The device proximity message 308 at least indicates to the controller 110 that a detection signal 116 was received by the detecting base station 104. The device proximity message 308 may also include other data. For example, the device proximity message 308 may provide a calculated or estimated distance between the detecting base station 104 and the wireless communication device 108. For the example of FIG. 3, the device proximity message 308 also includes a device ID identifying the wireless communication device 108 that was detected. Examples of other data that can be included in the device proximity message includes signal to noise ratios, bit error rate (BER) measurements, frame error rate (FER), packet error rate (PER), signal travel times, signal power levels, and identifiers identifying the detecting base station 104.

In some situations, the determination of whether the wireless communication device 108 should attempt to acquire service from the detecting base station 104 and whether the device proximity message 308 should be transmitted may be based on other characteristics of the detection signal 116 in addition to the reception of the signal 116. For example, the proximity of the wireless communication device 108 to the detecting base station 104 may be calculated or estimated based on characteristics of the detection signal 116 and the device proximity message 308 may be transmitted only when the estimated proximity is less than a proximity threshold. Examples of detection signal characteristics include a signal to noise ratio (SNR), bit error rate (BER), frame error rate (FER), packet error rate (PER), power level, and signal travel time.

The controller 318 determines, or at least estimates, the proximity of the authorized wireless communication device 108 to the detecting base station 104 based on one or more characteristics of the uplink signal. In the exemplary embodiment, the detection of an uplink signal from the communication device 106 is sufficient to determine that the communication device 106 is within a proximity range. The proximity is used to determine whether the communication device 106 is possibly within range of the base station 104 and at least possibly able to receive communication service from the base station 104. Therefore, the controller 318 at least determines whether the communication device 108 is possibly within range of the base station 104. If the controller 318 determines that the wireless communication device is possibly in range, a device proximity message 308 is sent to the network controller 110. When the network controller 110 returns an authorization via an authorization message 310, the detecting base station 104 transmits the user zone information 114. In some situations the detecting base station 104 also refrains from transmitting the communication pilot signal 112 until authorization is received if no other wireless communication devices are communicating with the detecting base station 104.

The controller 318 may determine whether to transmit the user zone information 114 and, therefore, the device proximity message, based on factors other than proximity of the wireless communication device 108 or the detection of the detection signal 116. For example, factors may include the available capacity of the detecting base station 104, core network requirements, required bandwidth of the wireless communication device communications, and availability of other base stations or communication service providers in the area. Accordingly, the base station 104 may not transmit the user zone information 114, device proximity message 308, and/or the pilot signal 112 even if the wireless communication device 108 is within range in some circumstances. As explained above, a detecting base station 104 may coordinate with the network and other femtocells in the region and set a schedule for transmitting its pilot signal to avoid collisions and reduce interference. In OFDM systems, fractional frequency reuse (FFR) may be coordinated among femtocell base stations to manage resources. Accordingly, depending on the particular implementation, the management of the transmission of user zone information may be performed solely by the detecting base station 104, solely by the network controller 110, or by both.

Figure 4:
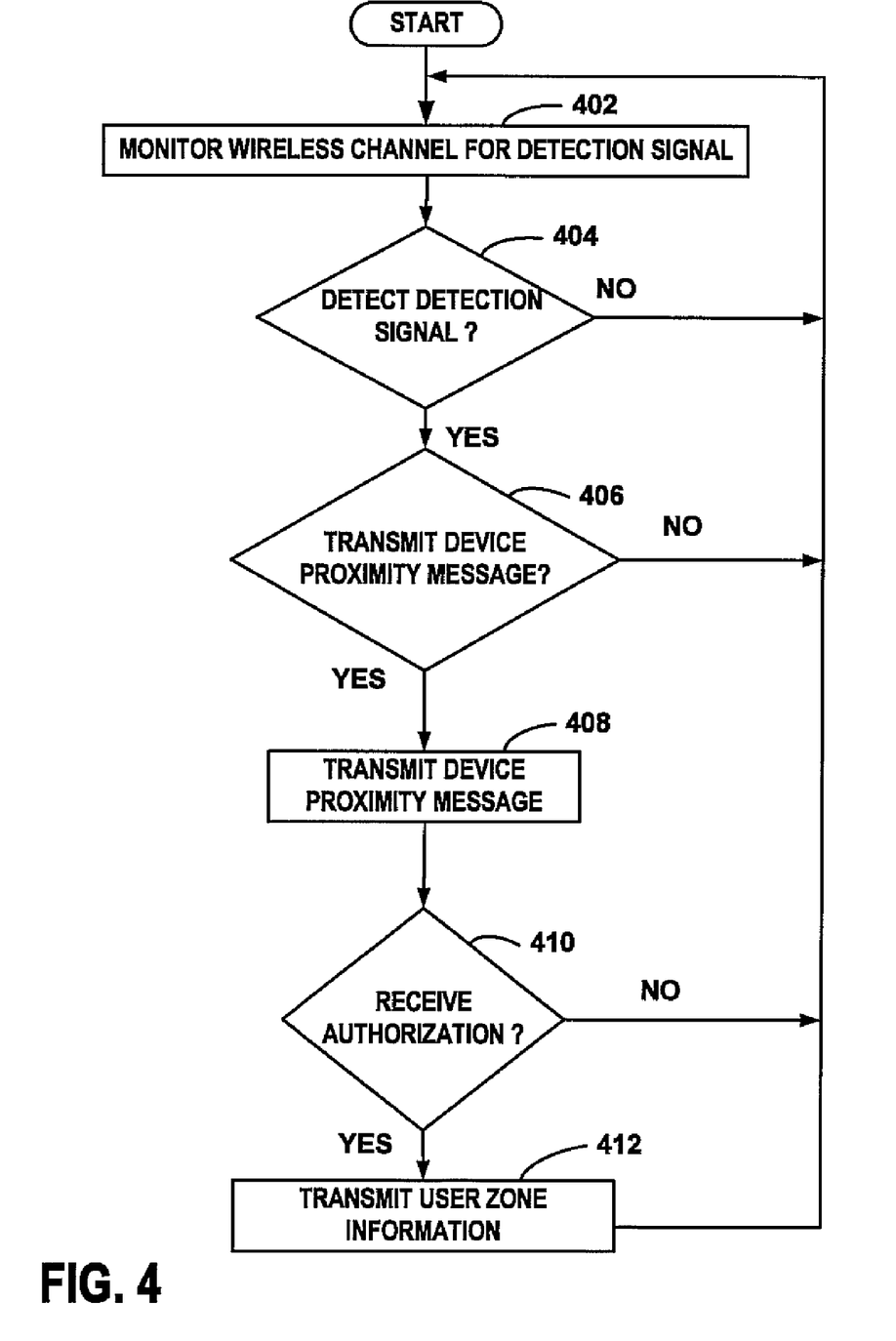
FIG. 4 is flow chart of a method of managing transmission of user zone information to a wireless communication device where presence of the wireless communication device is determined based on the detection of the detection signal.

FIG. 4 is flow chart of a method of managing transmission of user zone information 114 to a wireless communication device 108 where presence of the wireless communication device 108 is determined based on the detection of the detection signal 116. The method may be performed by any combination of hardware, software and/or firmware. The order of the steps discussed below may be varied and one or more steps may be performed simultaneously in some circumstances. For the example, the method is performed, at least in part, by executing code on the controller 318 in the detecting base station 104.

At step 402, the wireless channel that may contain the detection signal is monitored. The wireless communication device detector 118 attempts to demodulate and/or decode incoming signals within the wireless communication channel. In the exemplary embodiment, the uplink receiver 324 is tuned to decode any uplink signals 302 transmitted from any of the communication devices 108 in the user list stored in memory 320. The long code masks derived with the device identification values are applied to incoming signals until an incoming signal is detected. In this implementation, therefore, the incoming uplink signal 302 is the detection signal 116. Where other types of detection signals such as Bluetooth signals are used, the wireless communication device detector 118 may compare a characteristic of the received signals to determine whether a received signal was transmitted by a device within the user list. Accordingly, a Bluetooth signal may include an identification code that corresponds to the device identification values stored in memory 320. In some circumstances, the wireless communication device detector 118 may be configured to monitor all channels for any detection signals.

At step 404, it is determined whether a detection signal 116 has been received. For the example, the controller 318 determines that a detection signal 116 has been received if an incoming signal 302 can be decoded. In other circumstances, information within the detection signal 116 is applied to the user list to determine whether the received signal has been received from a communication device stored in the user list. If a detection signal 116 has been received, the method continues at step 406. Otherwise, the method returns to step 402 to continue monitoring the wireless channel.

At step 406, it is determined if the device proximity message should be transmitted. In some situations, step 406 can be omitted and the device proximity message 308 may be transmitted when the detection signal 116 is detected. In other situations, however, additional processing or communication is invoked before the device proximity message is transmitted. For example, system conditions of the detection base station 104, other base stations, the core network, and/or alternate networks can be evaluated to determine whether a handoff to the detecting base station 104 is desired. The core network may further determine whether a handoff should be performed after receiving the device proximity message. Accordingly, the ultimate decision whether to transmit the user zone information may be partially performed by the detecting base station when determining whether to transmit the device proximity message. If it is determined that the device proximity message should be transmitted, the method continues at step 408. Otherwise, the method returns to step 402.

At step 408, the device proximity message 308 is transmitted. The device proximity message 308 at least identifies the wireless communication device that has been detected. Other data, such as the measurements and calculations related to the proximity of the device, may be included with the device proximity message 308 is some circumstances.

At step 410, it is determined whether authorization from the network controller 118 has been received at the base station 104. For the example, an authorization 310 is received from the network controller 110 through the system infrastructure 102, Internet 312, access router 316, and network interface 306. Any suitable backhaul, however, can be used to receive the authorization message 310. A wireless link, for example, may be used in some circumstances. In addition to indicating whether transmission of user zone information has been authorized, the authorization message may include other data or instructions. The timing of the transmission, for example, may be indicated in the authorization 310 in order to minimize interference with broadcast messages transmitted by the macrocell base station 106. If no authorization has been received, the method returns to step 402 to continue monitoring the wireless channel. Otherwise, the method continues at step 412 where the user zone information is transmitted. In some situations, step 410 may include a time limit for receiving authorization. Also, an authorization-denied message may be sent in some circumstances to indicate the authorization has not been granted.

At step 412, the detecting base station 104 transmits the user zone information 114. The user zone information 104 is formatted and transmitted in accordance with the cellular system protocol and standards requirements with the broadcast channel used by the macrocell base station 106. The user zone information 114 is also transmitted in accordance with any instructions provided by the network controller 110. For example, any timing, channel, and/or power level corresponding to the transmission of the user zone information that is indicated in the authorization or other message is applied.

Figure 5:
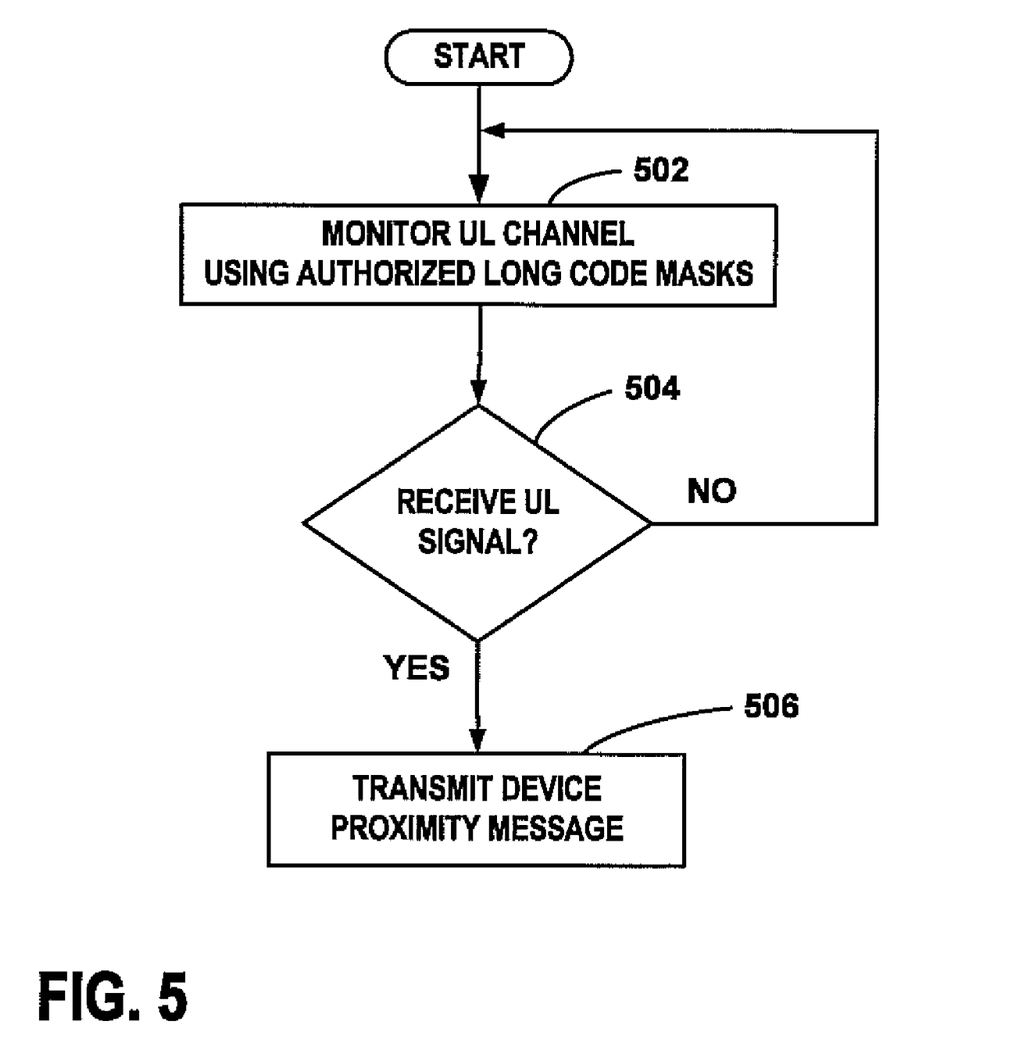
FIG. 5 is a flow chart of a method of managing transmission of user zone information where the detection signal is an uplink signal transmitted by an authorized wireless communication device.

FIG. 5 is a flow chart of a method of managing transmission of user zone information 114 where the detection signal 116 is an uplink signal 302 transmitted by an authorized wireless communication device 108. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 318 in the detecting base station 104.

At step 502, the uplink channels 302 are monitored for an uplink signal that is transmitted with a PLCM corresponding to an authorized communication device in the user list. The wireless communication device detector 118 attempts to decode incoming signal using the PLCM derived from the device identification values. The device identifiers, such as ESNs, MEIDs, or IMSIs, are applied in accordance with known techniques and the convention of the macro base station to generate a PLCM for each authorized device. The wireless communication device detector 118 has access to the operating parameters of the macrocell base station 106 such as the PN codes, frequency channel that are used by the wireless communication device to communicate with the originating base station 106. Demodulated signals are decoded using the PLCMs to attempt to decode the incoming signals. In some cases the PLCM maybe assigned by the base station.

At step 504, it is determined if an uplink signal is received from an authorized wireless communication device 108. If an incoming signal is successfully decoded, the controller 318 determines that the detection signal has been received and transmits the device proximity message at step 506. Otherwise, the method returns to step 502 to continue monitoring the uplink channels.

Figure 6:
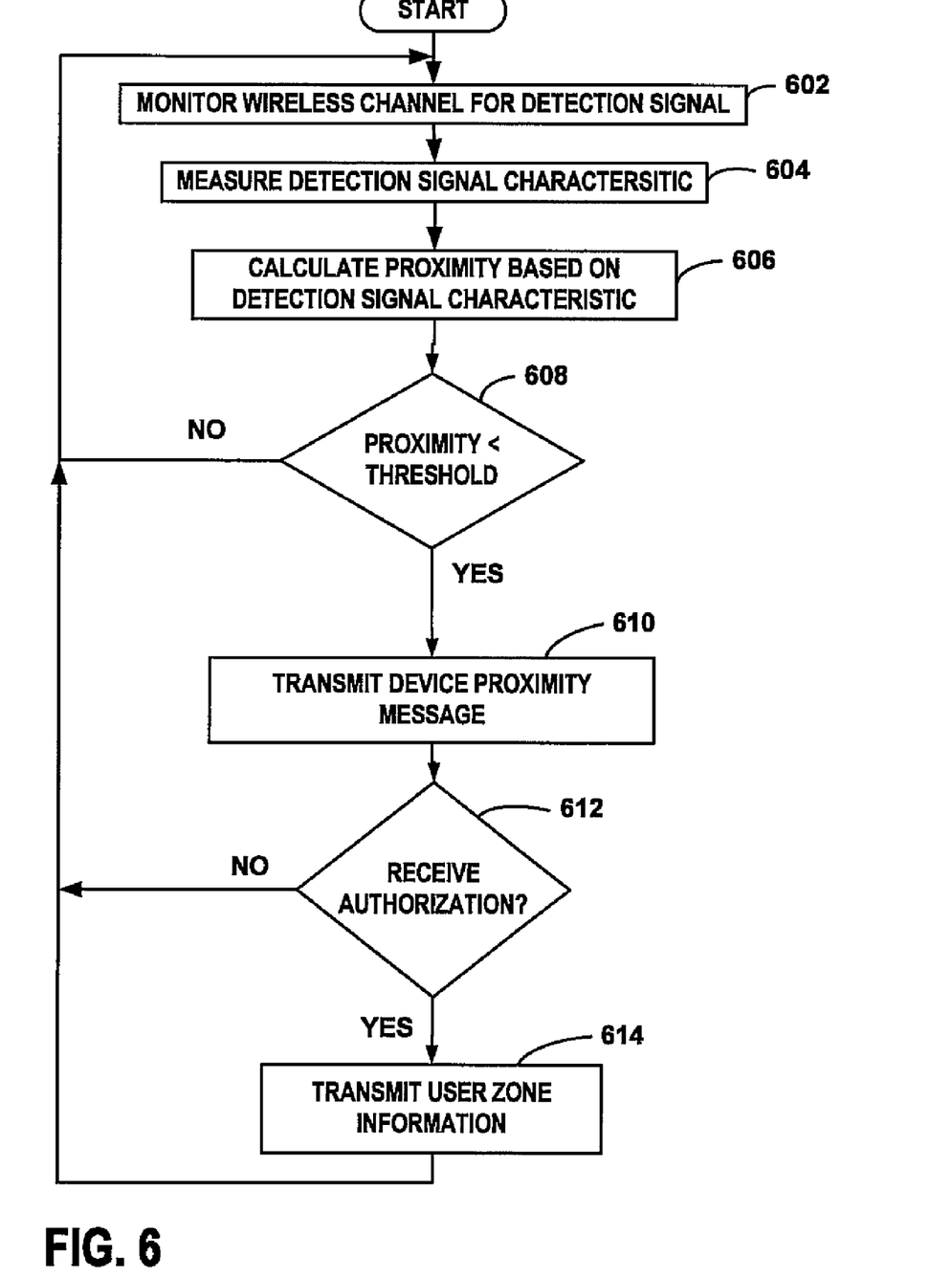
FIG. 6 is a flow chart of a method of managing transmission of user zone information where the proximity of the wireless communication device to the detecting base station is determined based on the detection signal.

FIG. 6 is a flow chart of a method of managing transmission of user zone information 114 where the proximity of the wireless communication device 108 to the detecting base station 104 is determined based on the detection signal. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 318 in the detecting base station 104.

At step 602, the wireless channel that may contain the detection signal is monitored. The wireless communication device detector 118 attempts to demodulate and/or decode incoming signals within the wireless communication channel.

At step 604, a characteristic of the detection signal is measured. One or more parameters such as power level or signal travel time are measured.

At step 606, the proximity of the communication device 108 to the detecting base station 104 is calculated. The proximity calculation may be based on any number of parameters or characteristics of the received detection signal as well as other factors. Examples of suitable parameters include parameters related to signal power level and a timing offset between a transmission and reception times. Other related factors may include transmission power level, location of one or more base stations and information extracted from detection signal and downlink signals such as time stamps, power level indicators, and power control indicators. In some circumstances, the proximity is based only on a detection of the uplink signal as discussed with reference to FIG. 4. The particular factors and calculation techniques depend on the type of communication system 100.

At step 608, it is determined whether the communication device 108 is close enough to the detecting base station 104 to justify transmitting use zone information 114 and, therefore, the device proximity message 308. The calculated proximity is compared to the threshold. In the exemplary embodiment, the proximity is determined to be less than the proximity threshold if the detection signal is detected. If the proximity is less than the threshold, the method continues at step 610 where the device proximity message is transmitted. Otherwise, the method returns to step 602. In some circumstances, this step may be omitted and the access point 102 may send proximity information to the core network with other information to allow the network controller 110 to make the determination of whether a communication device 108 should acquire service from the detecting base station 104 and whether the detecting base station 104 should transmit the user zone information 114.

At step 612, it is determined whether the base station 104 has received authorization to transmit the user zone information. If no authorization has been received, the method returns to step 602 to continue monitoring the wireless channel. If authorization has been received, the detecting base station 104 transmits the user zone information at step 614 and returns to step 602. As discussed above, detection of the signals and the transmission of the user zone information may occur while the wireless communication device 108 is in any of several states including active (traffic) states and idle (non-traffic) states.

Figure 7:
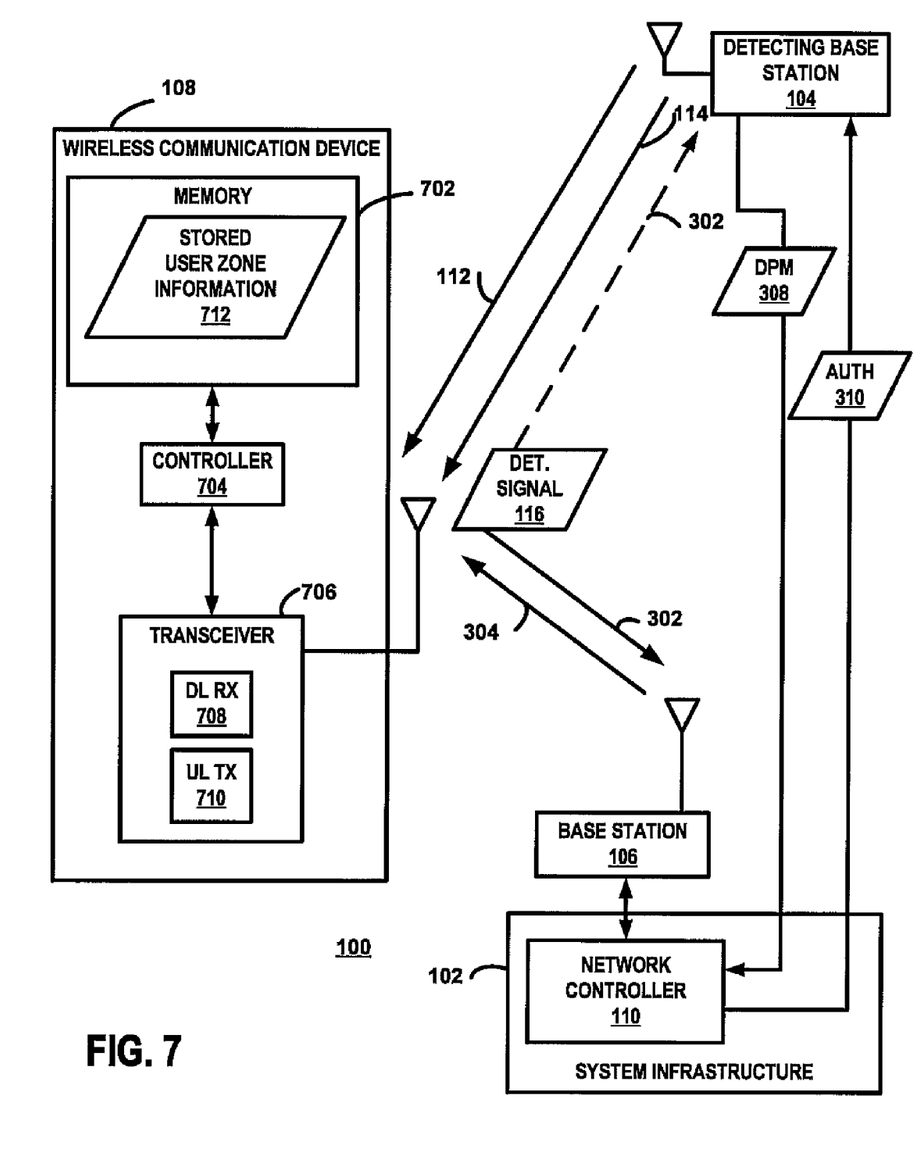
FIG. 7 is a block diagram of a wireless communication device receiving user zone information from a detecting base station.

FIG. 7 is a block diagram of a wireless communication device 108 receiving user zone information 114 from a detecting base station 104. The wireless communication device includes a memory 702, a controller 704 and a transceiver 706. The various functions and operations of the blocks of the wireless communication device 108 may be implemented in any number of devices, circuits, and/or elements as well as with various forms of executable code such as software and firmware. Two or more of the functional blocks of wireless communication device 108 may be integrated in a single device and the functions described as performed in any single device may be implemented over several devices. For example, at least portions of the functions of the transceiver 706 may be performed by the controller 704 in some circumstances.

The transceiver 706 exchanges uplink signals 302 and downlink signals 304 with the originating base station (macrocell base station) 106. A downlink receiver 708 in the transceiver 706 receives the downlink signals 304 and an uplink transmitter 710 transmits the uplink signals 302. As explained above, the detecting base station 104 eavesdrops on the uplink channel to detect the detection signal 116. In response to detection, user zone information of the detecting base station is transmitted by the detecting base station within the broadcast channel used by the macrocell base station 106. Since the wireless communication device is relatively close to the detecting base station 106, the wireless communication device 108 is able to receive the broadcast channel and the user zone information 114. The controller 704 retrieves stored user zone information 712 stored within the memory and compares the stored information to the received user zone information. The wireless communication device 108 determines if the received user zone information 114 indicates that the detecting base station is one of the base stations that the wireless communication device 108 is authorized to access. For the example, the stored information 712 is compared to the received information 114 and if the information matches, the controller determines that the detecting base station is accessible by the wireless communication device. As discussed herein, information is determined to match where at least an identified portion of the stored user zone information is the same as the corresponding received user zone information. As discussed above, the received and stored information may be the same set of parameters or one may be a subset of the other. A suitable example of comparing stored information to received information includes receiving a base station identifier (AP_ID) as broadcasted user zone information and comparing the base station identifier to stored base station identifiers within the wireless communication device. If the received identifier is the same as a stored identifier, the received user zone information is determined to match the stored user zone information. As discussed below, other stored user zone parameters associated with the base station identifier, such a frequency, PN code, PN offset, channel, and parameters related to time synchronization and frequency synchronization, are retrieved from memory and applied to attempt to acquire the detecting base station. Some or all of these configuration parameters may be stored in memory, received in the broadcasted user zone information, or both.

In response to the determination that the detecting base station is an authorized base station of the wireless communication device, wireless communication device attempts to acquire the pilot signal 112 of the detecting base station. Accordingly, the uplink receiver is tuned to the pilot channel of the detecting base station 104. The appropriate frequency, timing, and PN offset is applied to search for the pilot signal 112 transmitted from the detecting base station 104. As discussed above, some, all, or none of the parameters may be stored in memory and/or broadcast.

Figure 8:
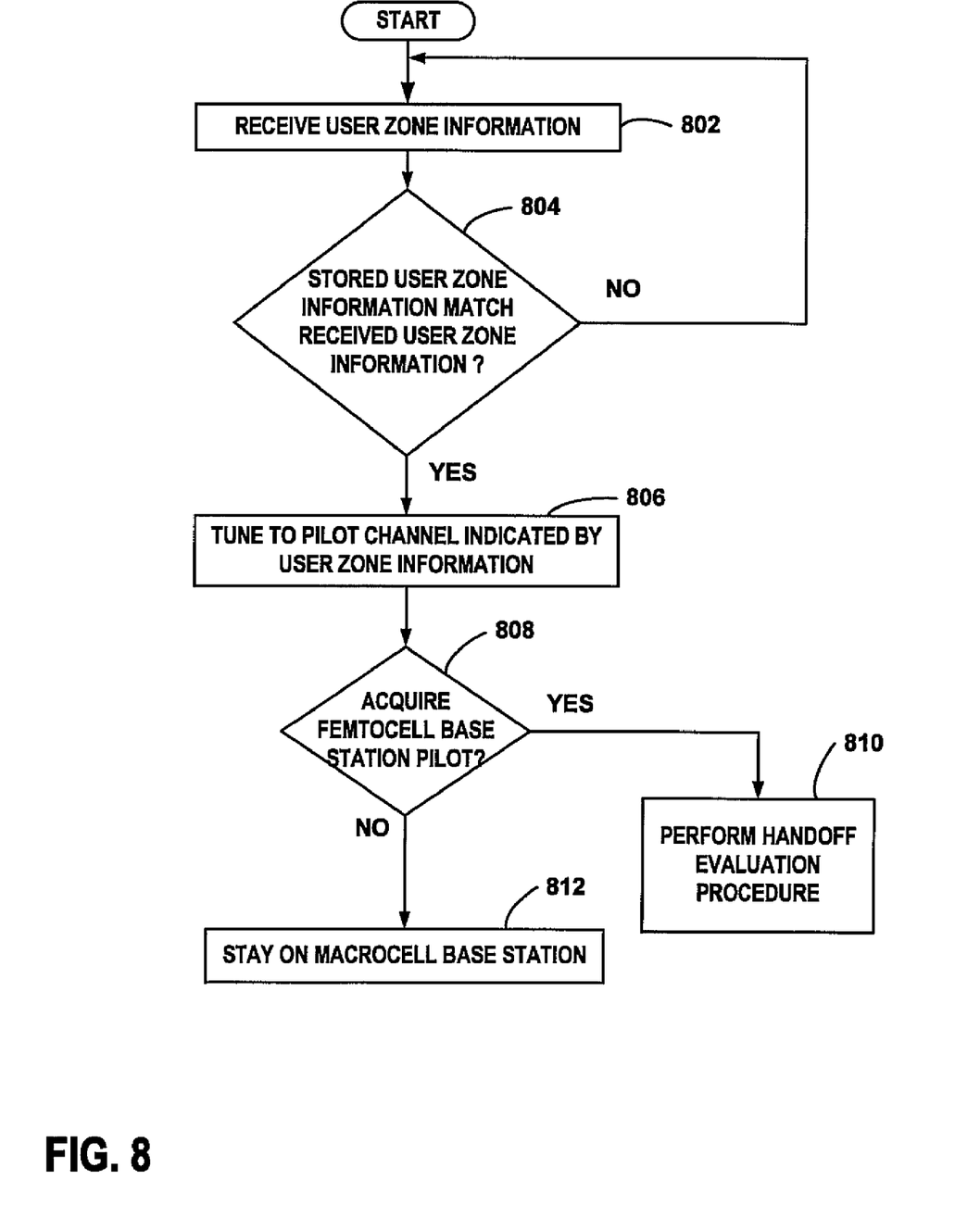
FIG. 8 is flow chart of a method of receiving user zone information at the wireless communication device.

FIG. 8 is flow chart of a method of receiving user zone information at the wireless communication device 108. The method may be performed by any combination of hardware, software and/or firmware. The order of the steps discussed below may be varied and one or more steps may be performed simultaneously in some circumstances. For the example, the method is performed, at least in part, by executing code on the controller 704 in the wireless communication device 108.

At step 802, the user zone information 114 is received at the wireless communication device. For the example, the user zone information 114 is received within the broadcast channel used by the macrocell base station 106.

At step 804, it is determined whether the received user zone information matches the stored user zone information stored in memory 702. The controller 704 retrieves the stored user zone information 712 and compares it to the received user zone information 114. If the received user zone information matches the stored information, the method continues at step 806. Otherwise, the method returns to step 802.

At step 806, the downlink receiver is tuned to the pilot channel indicated by the user zone information 114. The appropriate frequency, timing and PN offset are applied to attempt to receive the pilot signal 112 transmitted by the detecting base station 106. As discussed above, the user zone information may indicate the values of the parameters by including a base station identifier that can be associated with parameters stored at the wireless communication device or may indicate some or all of the values of the parameters by directly including the values in the broadcasted user zone information.

At step 808, it is determined whether the pilot signal 112 of the detecting base station has been successfully acquired. If the pilot signal has been acquired, the method continues at step 810 where a handoff evaluation procedure and potentially a handoff procedure are performed in accordance with known techniques. Otherwise, the method continues at step 812. Any of numerous procedures may be used to determine whether the pilot has been acquired. In some circumstances, a time limit may be applied in determining whether the pilot has been acquired. In other words, if the pilot has not been detected within a time limit, it is determined that the pilot signal has not been acquired and the procedure continues at step 812. At step 810, a handoff evaluation procedure is performed which results in a handoff, no handoff, or a handoff and a return to the originating base station 106. The evaluation procedure may be performed by any combination of the wireless communication device, the network controller, and/or the originating base station 106. The particular procedure depends on the several factors including at least the relative frequencies and the state of wireless communication device. Examples include at least four possible scenarios: idle handoff in the same frequency, idle handoff to a different frequency, active handoff in the same frequency, and active handoff to a different frequency. An idle handoff evaluation includes little, if any intervention from the originating base station 106 or the network controller 110. Evaluations on whether to proceed with an active handoff involves increased coordination with the originating base station 106 and/or the network controller 110. Since there are no soft-handoffs when an idle handoff is performed, an idle handoff includes attempting to acquire service and "camp on" the femtocell base station 104 and returning to the macrocell base station 106 if unsuccessful. At step 812, the search is terminated and the wireless communication device remains on the macrocell (originating) base station 106.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A detecting base station comprising:
 a wireless communication device detector configured to detect a presence of a wireless communication device based on a detection signal transmitted by the wireless communication device, the wireless communication device communicating with an originating base station;
 a network interface for communicating with a network controller connected to the detecting base station and to the originating base station, the network interface configured to: send a device proximity message at least indicating to the network controller that the wireless communication device has been detected by the detecting base station; and to receive, from the network controller, an authorization message authorizing the detecting base station to transmit the user zone information message; and a transmitter configured to transmit within a broadcast channel, in response to the detection and the receipt of the authorization message, user zone information at least identifying the detecting base station.

2. The detecting base station of claim 1, wherein the detecting base station is a femtocell base station providing a femtocell geographical service area smaller than a macrocell geographical service area provided by a macrocell base station and wherein the detection signal is an uplink signal transmitted to the macrocell base station.

3. The detecting base station of claim 1, wherein the user zone information includes data enabling the wireless communication device to identify at least one of a pseudorandom noise (PN) code offset of the detecting base station, a frequency band of the detecting base station, a channel of the detecting base station, and an identifier of the detecting base station.

4. The detecting base station of claim 1, wherein the broadcast channel is a logical channel mapped to a common physical channel implemented in accordance with a communication standard.

5. The detecting base station of claim 1, wherein the broadcast channel has a frequency equal to an originating base station broadcast channel frequency used by the originating base station.

6. The detecting base station of claim 5, wherein the broadcast channel has a pseudorandom number (PN) sequence offset equal to an originating base station broadcast PN sequence used by the originating base station.

7. The detecting base station of claim 4, wherein the transmitter is configured to transmit the user zone information message within one of a code division multiple access (CDMA) signal, UMTS signal, WiMAX signal, or OFDM signal.

8. The detecting base station of claim 1 wherein the detection signal is one of a Bluetooth signal, WiFi signal or near-field communication (NFC) signal.

9. A wireless communication device comprising: a receiver configured to receive, while registered with an originating base station, user zone information transmitted by a detecting base station within a broadcast channel used by an originating base station, the user zone information describing operational parameters of a service region associated with the detecting base station and authorized for transmission by a network controller in response to the network controller receiving a device proximity message from the detecting base station, the device proximity message sent in response to the detecting base station detecting a presence of the wireless communication device based on a detection signal transmitted by the wireless communication device; and a controller configured to tune, based on the user zone information and in response to receiving the user zone information, the receiver to receive a pilot signal transmitted by the detecting base station.

10. The wireless communication device of claim 9, wherein the detecting base station is a femtocell base station providing a femtocell geographical service area smaller than a macrocell geographical service area provided by a macrocell base station.

11. The wireless communication device of claim 10, wherein the controller is further configured to identify, based on the user zone information, at least one of a pseudorandom noise (PN) code offset of the detecting base station pilot signal, a frequency band of the detecting base station pilot signal, a channel of the detecting base station pilot signal, and an identifier of the detecting base station.

12. The wireless communication device of claim 11, wherein the broadcast channel has a frequency equal to a broadcast channel frequency of the originating base station and a pseudorandom number (PN) sequence offset equal to an originating base station broadcast PN sequence used by the originating base station.

13. The wireless communication device of claim 12, wherein the receiver is configured to receive the user zone information message within one of a code division multiple access (CDMA) signal, UMTS signal, WiMAX signal, or OFDM signal.

14. The wireless communication device of claim 9 wherein the detection signal is one of a Bluetooth signal, WiFi signal or near-field communication (NFC) signal.

15. A network controller connected to an originating base station and a detecting base station, the network controller configured to:
receive a device proximity message from the detecting base station indicating that an uplink signal transmitted by a wireless communication device that is communicating with the originating base station was received at the detecting base station;
determine that the wireless communication device should attempt to acquire wireless service from the detecting base station; and
transmit an authorization message to the detecting base station authorizing the detecting base station to transmit user zone information within a broadcast channel used by the originating base station, the user zone information at least identifying the detecting base station.

16. The network controller of claim 15, wherein the detecting base station is a femtocell base station providing a femtocell geographical service area smaller than a macrocell geographical service area provided by a macrocell base station and wherein the detection signal is an uplink signal transmitted to the macrocell base station.

17. The network controller of claim 15, wherein the user zone information includes data enabling the wireless communication device to identify at least one of a pseudorandom noise (PN) code offset of the detecting base station, a frequency band of the detecting base station, a channel of the detecting base station, and an identifier of the detecting base station.

18. The network controller of claim 15, wherein the broadcast channel has a frequency equal to a broadcast channel frequency of the originating base station and a pseudorandom number (PN) sequence offset equal to an originating base station broadcast PN sequence used by the originating base station.

* * * * *